United States Patent [19]

Nilssen

[11] Patent Number: 4,819,146
[45] Date of Patent: Apr. 4, 1989

[54] RESONANT INVERTER HAVING FREQUENCY CONTROL

[76] Inventor: Ole K. Nilssen, Caesar Dr. Rte. 5, Barrington, Ill. 60010

[21] Appl. No.: 80,865

[22] Filed: Aug. 3, 1987

Related U.S. Application Data

[63] Continuation-in-part of Ser. No. 917,788, Oct. 10, 1986, Pat. No. 4,727,470.

[51] Int. Cl.$^4$ .............................................. H02M 7/44
[52] U.S. Cl. ...................... 363/98; 363/132; 315/DIG. 7
[58] Field of Search .................. 315/DIG. 7; 363/17, 363/98, 131, 132, 136

[56] References Cited

U.S. PATENT DOCUMENTS

| | | | |
|---|---|---|---|
| 4,277,728 | 7/1981 | Stevens | 315/DIG. 7 |
| 4,525,774 | 6/1985 | Kino et al. | 363/17 |
| 4,541,041 | 9/1985 | Park et al. | 363/41 |
| 4,692,855 | 9/1987 | Kuroiwa et al. | 363/95 |
| 4,700,285 | 10/1987 | Szepesi | 363/97 |
| 4,712,170 | 12/1987 | Grace | 363/98 |

Primary Examiner—William M. Shoop, Jr.
Assistant Examiner—Marc S. Hoff

[57] ABSTRACT

In a power-line-operated high-frequency electronic fluorescent lamp ballast, an inverter is powered from a DC supply voltage having a substantial amount of 120 Hz ripple. The fluorescent lamp is connected with the inverter's squarewave output voltage by way of a series-resonant L-C circuit. The amount of power supplied by the inverter to the series-resonant L-C circuit and/or to the fluorescent lamp at any given moment depends on three significant factors: (i) the instantaneous magnitude of the DC supply voltage, (ii) the instantaneous frequency of the inverter's squarewave output voltage, and (iii) the instantaneous operational characteristics of the fluorescent lamp. Arrangements are provided whereby the instantaneous inverter frequency is automatically adjusted so as to prevent inverter overload in case the fluorescent lamp is non-present or inoperative.

20 Claims, 1 Drawing Sheet

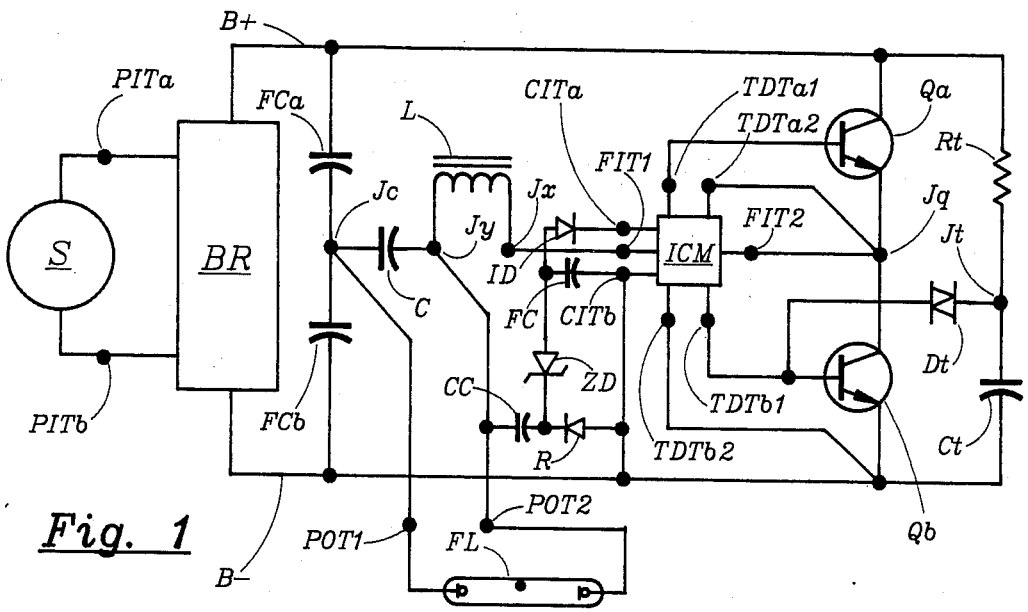
Fig. 1
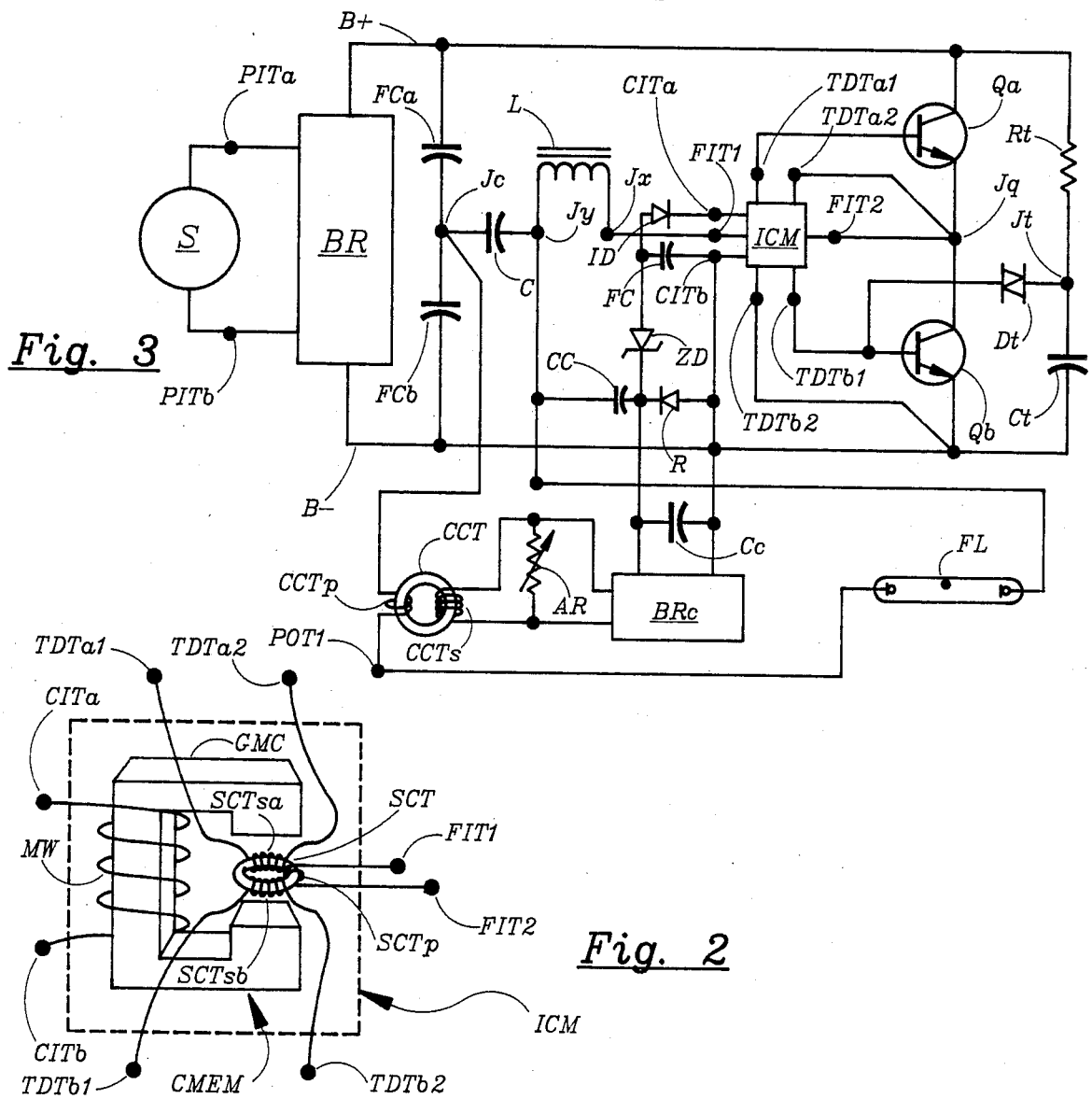
Fig. 3
Fig. 2

RESONANT INVERTER HAVING FREQUENCY CONTROL

RELATED APPLICATION

This is a Continuation-in-Part of previous application Ser. No. 06/917,788 filed Oct. 10, 1986, U.S. Pat. No. 4,727,470.

BACKGROUND OF THE INVENTION

1. Field of Invention

The present invention relates to frequency-controlled inverters having series-tuned L-C output circuitry, particularly of a kind wherein control of frequency provides control of output power in such manner as to compensate for effects of variations in the magnitude of the DC supply voltage and/or in the loading provided by way of the L-C output circuitry.

2. Elements of Prior Art

In inverter-type fluorescent lamp ballasts using a series-excited parallel-loaded resonant L-C circuit for matching the inverter's output to the fluorescent lamp, an important problem relates to possible damage of the inverter in case the series-excited parallel-loaded resonant L-C circuit is left unloaded, such as may occur in the fluorescent lamp were to be removed. To prevent such damage from occurring, it is necessary to provide means whereby the maximum power drawn from the inverter be manifestly limited to a safe level. For instance, such limitation is accomplished by Zansky in U.S. Pat. No. 4,392,087 by using the inverter's DC supply as an alternative load which activates as soon as the output voltage exceeds a certain magnitude. Or, in U.S. Pat. No. 4,398,126 to Zuchtriegel, inverter protection is provided by way of disabling the inverter in case the L-C circuit is left unloaded.

SUMMARY OF THE INVENTION

Objects of the Invention

An object of the present invention is that of providing an improved controllable inverter-type power supply.

These, as well as other objects, features and advantages of the present invention will become apparent from the following description and claims.

BRIEF DESCRIPTION

In its basic preferred embodiment, the present invention constitutes a power-line-operated inverter-type power supply operable to power a fluorescent lamp. This power supply comprises:

(a) a full-bridge rectifier operative to connect with a 60 Hz power line and to provide a full-wave-rectified DC supply voltage at a pair of DC terminals, the magnitude of this DC supply voltage exhibiting substantial variations at a fundamental frequency of 120 Hz;

(b) a half-bridge inverter connected with the DC terminals and operative to provide a squarewave output voltage at a pair of inverter terminals, the instantaneous magnitude of the squarewave output voltage being proportional to that of the DC supply voltage;

(c) a series-combination of an inductor and a capacitor connected across the inverter terminals, this L-C series-circuit being resonant at or near the frequency of the inverter's squarewave output voltage;

(d) a fluorescent lamp effectively connected in parallel with the capacitor of the L-C series-circuit, the magnitude of the voltage developing across the lamp being a function of: (i) the magnitude of the inverter's squarewave output voltage, the frequency of the inverter's squarewave output voltage, and (iii) the magnitude of the current drawn by the lamp; and (e) frequency control means connected in circuit with the half-bridge inverter and its L-C output circuit, the frequency control means being operative to vary the frequency of the inverter's squarewave output voltage: (i) as a function of the magnitude of the voltage developing across the capacitor of the L-C circuit and in such manner that the magnitude of the voltage developing across this capacitor will never exceed the magnitude required for properly starting the fluorescent lamp, which therefore automatically prevents the L-C circuit from ever drawing an excessive amount of power from the inverter, and (i) as a function of the magnitude of the current flowing through the lamp, thereby to provide a means for regulating the RMS magnitude of the lamp current independent of the magnitude of the voltage present across the capacitor of the L-C circuit.

The inverter is of a self-oscillating type and uses a saturable current transformer in the positive feedback loop. The saturation flux density of this saturable current transformer effectively determines the inversion frequency; and this saturation flux density is affected by a cross-magnetic flux.

Inverter frequency control is attained by subjecting the saturable current transformer to a controlled degree of cross-magnetic flux. The cross-magnetic flux is provided by an adjacently positioned electro-magnet, the magnetizing current of which has an instantaneous magnitude functionally dependent on: (i) the magnitude of the voltage present across the capacitor of the L-C circuit, and/or (ii) the magnitude of the current flowing through the fluorescent lamp.

BRIEF DESCRIPTION OF THE DRAWINGS

FIG. 1 provides a schematic diagram of a basic version of the preferred embodiment of the invention.

FIG. 2 provides a detailed view of the frequency control means, including the saturable current feedback transformer and the adjacently positioned cross-magnetizing electro-magnet.

FIG. 3 provides a schematic diagram of a more elaborate version of the preferred embodiment of the invention.

DESCRIPTION OF THE PREFERRED EMBODIMENT

Details of Construction

FIG. 1 schematically illustrates the electrical circuit arrangement of the preferred embodiment in its most basic form.

In FIG. 1, a source S of ordinary 120 Volt/60 Hz power line voltage is applied to power input terminals PITa and PITb; which terminals, in turn, are connected with a bridge rectifier BR. The DC output from bridge rectifier BR is applied to a B+ bus and a B− bus, with the B+ bus being of positive polarity.

A first filter capacitor FCa is connected between the B+ bus and a junction Jc; and a second filter capacitor FCb is connected between junction Jc and the B− bus.

A first switching transistor Qa is connected with its collector to the B+ bus and with its emitter to a junction Jq.

A second switching transistor Qb is connected with its collector to junction Jq and with its emitter to the B− bus.

An inverter control means ICM has a pair of feedback input terminals FIT1 and FIT2, a first pair of transistor drive terminals TDTa1 and TDTa2, a second pair of transistor drive terminals TDTb1 and TDTb2, and a pair of control input terminals CITa and CITb.

Input terminals FIT1 and FIT2 are respectively connected with junction Jq and a junction Jx; transistor drive terminals TDTa1 and TDTa2 are respectively connected with the base and the emitter of transistor Qa; transistor drive terminals TDTb1 and TDTb2 are respectively connected with the base and the emitter of transistor Qb; and control input terminals CITb and CITa are respectively connected with the B− bus the cathode of an isolating diode ID.

The anode of isolating diode ID is connected with the anode of a Zener diode ZD; whose cathode is connected with the cathode of a rectifier R; whose anode is connected with the B− bus. A filter capacitor FC is connected between the anode of Zener diode ZD and the B− bus; and a coupling capacitor CC is connected between a junction Jy and the cathode of rectifier R.

A capacitor C is connected between junction Jc and junction Jy; and an inductor L is connected between junctions Jy and Jx. Junctions Jc and Jy are respectively connected with power output terminals POT1 and POT2; across which output terminals is connected a fluorescent lamp FL.

A resistor Rt is connected between the B+ bus and a junction Jt; a capacitor Ct is connected between junction Jt and the B-bus; and a Diac Dt is connected between junction Jt and the base of transistor Qb.

FIG. 2 provides details of inverter control means ICM.

In FIG. 2, a saturable current transformer SCT has: (i) a primary winding SCTp connected between feedback input terminals FIT1 and FIT2, (ii) a first secondary winding SCTsa connected between the first pair of transistor drive terminals TDTa1 and TDTa2, and (iii) a second secondary winding SCTsb connected between the second pair of transistor drive terminals TDTb1 and TDTb2.

A cross-magnetizing electro-magnet CMEM has a gapped magnetic core GMC; and saturable current transformer SCT is positioned within the gap thereof.

Gapped magnetic core GMC has a magnetizing winding MW, the terminals of which are connected between control input terminals CIT1 and CIT2.

FIG. 3 schematically illustrates a more elaborate version of the preferred embodiment of the present invention. The circuit of FIG. 3 is identical to that of FIG. 1 except as follows.

Control input terminals CITa and CITb of inverter control means ICM are additionally connected with the output terminals of a bridge rectifier BRc, across which output terminals is also connected a filter capacitor Cc. The input terminals of bridge rectifier BRc are connected with secondary winding CCTs of control current transformer CCT. An adjustable resistor AR is connected across the input terminals of bridge rectifier BRc. Primary winding CCTp of control current transformer CCT is connected between junction Jc and power output terminal POT1.

Details of Operation

The operation of the half-bridge inverter of FIG. 1 is conventional and is explained in conjunction with FIG. 8 of U.S. Pat. No. Re. 31,758 to Nilssen. However, as indicated in FIG. 2, only a single saturable current feedback transformer is used instead of the two saturable current feedback transformers shown in Nilssen's FIG. 8. The resulting difference in operation is of no consequence in connection with the present invention.

For a given magnitude of the DC supply voltage, due to the effect of the L-C circuit, the magnitude of the current provided to the fluorescent lamp is a sensitive function of the inverter's oscillating frequency. In turn, this oscillating frequency, which is nominally about 30 kHz, is sensitively dependent on the magnetic flux saturation characteristics of the magnetic core of the saturable current transformer SCT; which saturable current transformer is used in the positive feedback circuit of the self-oscillating inverter.

Details in respect to the effect of the magnetic flux saturation characteristics on the inverter's oscillation frequency are provided in U.S. Pat. No. 4,513,364 to Nilssen.

Specifically, as the saturation flux density of the saturable current transformer is reduced, the inverter's oscillation frequency increases.

One way of reducing the transformer's saturation flux density is that of increasing the temperature of the ferrite magnetic core used in that transformer; which effect is further explained in U.S. Pat. No. 4,513,364 to Nilssen.

Another way of reducing the transformer's saturation flux density is that of subjecting the transformer's ferrite magnetic core to a cross-magnetizing flux, such as from an adjacently placed permanent magnet or electro-magnet. That way, the saturation flux density of the transformer's ferrite magnetic core decreases with increasing cross-magnetizing flux.

Thus, in view of FIGS. 1 and 2, as long as the L-C circuit is substantially series-resonant at the inverter's oscillation frequency whenever there is no cross-magnetization of the saturable feedback current transformer SCT, it is clear that: (i) the higher be the magnitude of the current provided to control input terminals CITa/CITb, (ii) the higher be the resulting cross-input magnetizing field produced by the electro-magnet (iii) the more reduction there be in the saturation flux density of the current transformer's ferrite magnetic core, (iv) the higher be the inverter's oscillation frequency, and (v) the lower be the magnitude of the current provided from the output terminals of the L-C series-circuit (terminals Jc/Jy).

In other words: the more current be provided to control input terminals CITa/CITb: (i) with the fluorescent lamp non-connected and/or inoperative, the lower be the magnitude of the voltage developing across tank-capacitor C; or (ii) with the fluorescent lamp connected and operative, the lower be the magnitude of the current provided to the fluorescent lamp.

The magnitude of the current provided to the control input terminals CITa/CITb is a sharply non-linear function of the magnitude of the high-frequency voltage present at terminals Jc/Jy. As soon as the peak magnitude of this high-frequency voltage exceeds a predetermined level, current starts flowing through Zener diode ZD and into control input terminals CIT1/CIT2, thereby through magnetizing winding MW of gapped magnetic core GMC, thereby cross-magnetizing saturable current transformer SCT, thereby increasing the inverter's oscillation frequency, thereby causing the magnitude of the high-frequency voltage to assume a value that is substantially lower than that which otherwise would have been the case.

The Zener voltage is chosen to be about equal to the peak-to-peak magnitude of the high-frequency voltage required to properly ignite fluorescent lamp FL; which implies that the inverter's frequency will be automatically controlled (increased) just enough to limit the magnitude of the high-frequency voltage between junctions Jc and Jy to be no higher than that required for properly igniting the fluorescent lamp.

As soon as the fluorescent lamp ignites, the magnitude of the high-frequency voltage decreases by a substantial factor, thereby ensuring that no current will be provided to control input terminals CIT1/CIT2 as long as the lamp is indeed in normal operation. That is, the very act of lamp ignition will cause the magnitude of the high-frequency voltage to decrease below the level required to effect avalanching in the Zener diode.

In the circuit arrangement of FIG. 3, the lamp current is rectified, filtered, and used as current for the magnetizing winding MW of the cross-magnetizing electro-magnet CMEM. That way, control of the inverter's frequency is determined by the magnitude of the lamp current: an increase in the magnitude of the lamp current will cause an increase in the inverter's oscillation frequency; which will result in the magnitude of the lamp current being maintained at a substantially constant level regardless of many factors which would otherwise have caused the magnitude of the lamp current to change, factors such as: average and/or instantaneous changes in the magnitude of the DC supply voltage; lamp aging; lamp temperature; temperature of the saturable feedback transformer; variations in the parameters of the various circuit components; etc.

The particular magnitude to which the lamp current will be controlled depends on the setting of adjustable resistor AR, as well as on such factors as overall loop-gain, loop current and/or voltage threshold means, etc.

Additional Comments (a) One important implication of controlling the magnitude of the lamp current such as to remain substantially constant irrespective of the instantaneous magnitude of the DC supply voltage is that of attaining a substantially lower lamp current crest factor as compared with the situation that would have existed when not so controlling the lamp current magnitude.

(b) Another important implication of controlling the magnitude of the lamp current is that of being able to control the waveshape of the current drawn by the inverter power supply from the power line.

(c) Detailed information relative to a fluorescent lamp ballast wherein the fluorescent lamp is powered by way of a series-excited parallel-loaded L-C resonant circuit is provided in U.S. Pat. No. 4,554,487 to Nilssen.

One effect of such a ballasting arrangement is that of making the waveshape of the voltage provided across the output to the fluorescent lamps very nearly sinusoidal, even though the output from the inverter itself, at the input to the series-resonant L-C circuit, is basically a squarewave.

(d) The circuit arrangements of FIGS. 1 and 3 are applicable to various loads and for various reasons.

For instance, regardless of the type of load used, the control arrangement disclosed can be used to regulate power output against variations in the magnitude of the power line voltage.

Or; in case of the load being a rectifier means and a storage battery requiring to be charged, the frequency control means can be used to provide the required tapering of the charging current.

In situations where an inverter is loaded with a series-resonant parallel-loaded L-C circuit, the control means provided prevents the magnitude of the high-frequency voltage developing across the tank-capacitor of the L-C circuit from reaching destructive levels.

(e) When no current is provided to control input terminals CITa/CITb, the half-bridge inverter self-oscillates at a base frequency of about 30 kHz. Then, as current is provided to the control input terminals, the inverter's oscillation frequency increases, but not any higher than to twice the base frequency.

(f) The instantaneous peak-to-peak magnitude of the squarewave voltage provided by the half-bridge inverter between junctions Jq and Jc is substantially equal to the instantaneous magnitude of the DC supply voltage; which is to say that the inverter's squarewave output voltage has a peak magnitude substantially equal to half the magnitude of the DC supply voltage.

(g) During at least part of each half-cycle of the 120 Volt/60 Hz power line input voltage, the instantaneous absolute magnitude of the DC supply voltage is substantially equal to that of the power line input voltage.

(h) Saturable current transformer SCT requires only a miniscule Volt-Ampere input and the voltage-drop across its primary winding is only a small fraction of one Volt. Hence, the magnitude of the voltage-drop between junctions Jq and Jx is substantially negligible, and the inverter's output voltage is therefore effectively provided between junctions Jx and Jc; which means that the inverter's full squarewave output voltage is provided across the series L-C circuit.

(i) By inserting a threshold device, such as a Zener diode, in series with the output from rectifier BRc, it is possible to attain a situation wherein no regulation takes place except when the magnitude of the lamp current exceeds a predetermined level.

(j) To improve loop-gain in the control arrangement, thereby to attain much increased control sensitivity, control current to control input terminals CIT1/CIT2 can be drawn from the DC supply voltage by way of a transistor——with the transistor base being controlled with current as provided either: (i) in response to the magnitude of the high-frequency voltage present between junctions Jc and Jy, by way of the excess-voltage-magnitude-sensing circuit comprised of elements CC, R, ZD, FC and ID, or (ii) in response to the magnitude of the current flowing through the fluorescent lamp, by way of the lamp-current-magnitude-sensing circuit comprised of CCT, AR BRc and Cc.

(k) It is believed that the present invention and its several attendant advantages and features will be understood from the preceding description. However, without departing from the spirit of the invention, changes may be made in its form and in the construction and interrelationships of its component parts, the form herein presented merely representing the presently preferred embodiment.

I claim:
1. An arrangement comprising:
an inverter powered from a DC supply voltage, the inverter providing a squarewave output voltage at a pair of output terminals, the squarewave output voltage having a frequency, the inverter having control means operative in response to a control signal to control the frequency;

a series-combination of an inductor and a capacitor connected across the output terminals, an AC voltage developing across the capacitor in response to the squarewave output voltage, the magnitude of the AC voltage being an inverse function of the frequency;

connect means operative to permit connection of a load in parallel circuit with the capacitor; and first sensor means connected in circuit between the series-combination and the control means, the first sensor means being operative in response to the magnitude of the AC voltage to provide at least part of the control signal to the control means, thereby to cause the frequency to increase as a function of the magnitude of the AC voltage; thereby, in turn, to cause the AC voltage to assume a lower magnitude than would have been the case without providing said at least part of the control signal.

2. The arrangement of claim 1 wherein the first sensor means comprises threshold means operative to make the provision of said at least part of the control signal a non-linear function of the magnitude of the AC voltage.

3. The arrangement of claim 2 wherein the threshold means is operative to provide said at least part of the control signal only when the magnitude of the AC voltage exceeds a predetermined level.

4. The arrangement of claim 1 wherein: (i) a load is indeed connected in parallel circuit with the capacitor and is operative to draw a load current therefrom, and (ii) a second sensor means is connected in circuit with the load and is operative to provide at least a part of the control signal in response to the magnitude of the load current.

5. The arrangement of claim 4 and adjustment means operative to permit adjustment of said at least part of the control signal provided by the second sensor means in response to the magnitude of the load current.

6. The arrangement of claim 1 wherein: (i) in the absence of the control signal, the squarewave output voltage assumes a nominal frequency, and (ii) in the absence of a load connected in parallel circuit with the capacitor, the series-combination constitutes a high-Q tuned circuit series-resonant at or near the nominal frequency.

7. An arrangement comprising:
source means operative to provide a first AC voltage across a first pair of AC terminals, the source means having control means operative on receipt of a control signal to cause the frequency of the first AC voltage to increase with respect to a nominal frequency which prevails in the absence of the control signal;

a series-combination of a tank-inductor and a tank-capacitor connected across the first AC terminals, the series-combination constituting a high-Q tuned circuit series-resonant at or near the nominal frequency;

connect means operative, by way of a second pair of AC terminals, to permit connection of a load in parallel circuit with the tank-capacitor, a second AC voltage being present at the second pair of AC terminals, the magnitude of the second AC voltage being an inverse function of the frequency of the first AC voltage; and sensor means connected in circuit between the series-combination and the control means and, in response to the magnitude of the second AC voltage, operative to provide a part of the control signal, thereby to cause the frequency of the first AC voltage to increase; thereby, in turn, to cause the magnitude of the second AC voltage to diminish with respect to a level which would have prevailed in the absence of said part of the control signal.

8. The arrangement of claim 7 wherein the sensor means comprises threshold means, thereby to provide said part of the control signal only when the magnitude of the second AC voltage exceeds a predetermined level.

9. The arrangement of claim 8 wherein the load is indeed connected in parallel circuit with the tank-capacitor, thereby: (i) drawing a load current from the second pair of AC terminals, and (ii) preventing the magnitude of the second AC voltage from reaching the predetermined level.

10. The arrangement of claim 9 combined with load current sensor means connected in circuit with the load and operative to provide a part of the control signal in response to the magnitude of the load current, thereby to control the magnitude of the load current such as to cause it to assume a roughly constant magnitude irrespective of variations in conditions such as the magnitude of the first AC voltage and the impedance characteristics of the load.

11. The arrangement of claim 10 combined with adjustment means connected in circuit with the load current sensing means and operative to permit adjustment of said roughly constant magnitude.

12. The arrangement of claim 8 wherein the load is characterized by having to be provided with a conditioning voltage of a relatively high magnitude before becoming operative to draw its load current, which load current is then drawn by the load at a sustaining voltage of a relatively low magnitude.

13. The arrangement of claim 12 wherein the predetermined level is approximately equal to the relatively high magnitude.

14. The arrangement of claim 13 wherein the relatively low magnitude is substantially lower than the relatively high magnitude.

15. An arrangement comprising:
source means having AC terminals and being operative to provide an AC voltage thereat, the source means having control means operable on receipt of control input to change the frequency of the AC voltage between a first frequency and a second frequency;

load terminals connected with a load means, the load means drawing a load current;

frequency-responsive circuit means connected between the AC terminals and the load terminals; and feedback means connected in circuit between the load terminals and the control means, the feedback means being operative to provide control input such as to cause the AC voltage to assume: (i) its first frequency whenever the magnitude of the load current is relatively low, and (ii) its second frequency whenever the magnitude of the load current is relatively high.

16. The arrangement of claim 15 wherein: (i) the frequency-responsive circuit means comprises an L-C series-circuit effectively connected across the AC terminals, (ii) the L-C series-circuit has a natural resonance frequency, (iii) the natural resonance frequency is approximately equal to said second frequency, and (iv)

said first frequency is such as to be significantly different from the natural resonance frequency.

17. The arrangement of claim 16 wherein the first frequency is higher than the natural resonance frequency.

18. The arrangement of claim 15 wherein the load means is of such nature: (i) as to require, in order to draw a substantial amount of load current, to be initiated with a relatively high-magnitude conditioning voltage, and (ii) as to draw, after having been initiated with the relatively high-magnitude voltage, to draw a substantial amount of load current at a relatively low-magnitude operating voltage.

19. The arrangement of claim 15 wherein, whenever the magnitude of the load current is zero, the magnitude of the voltage developing across the load terminals is limited to a predetermined level.

20. The arrangement of claim 19 wherein the predetermined level is of a magnitude different from that of the AC voltage.

* * * * *